Figure 1:
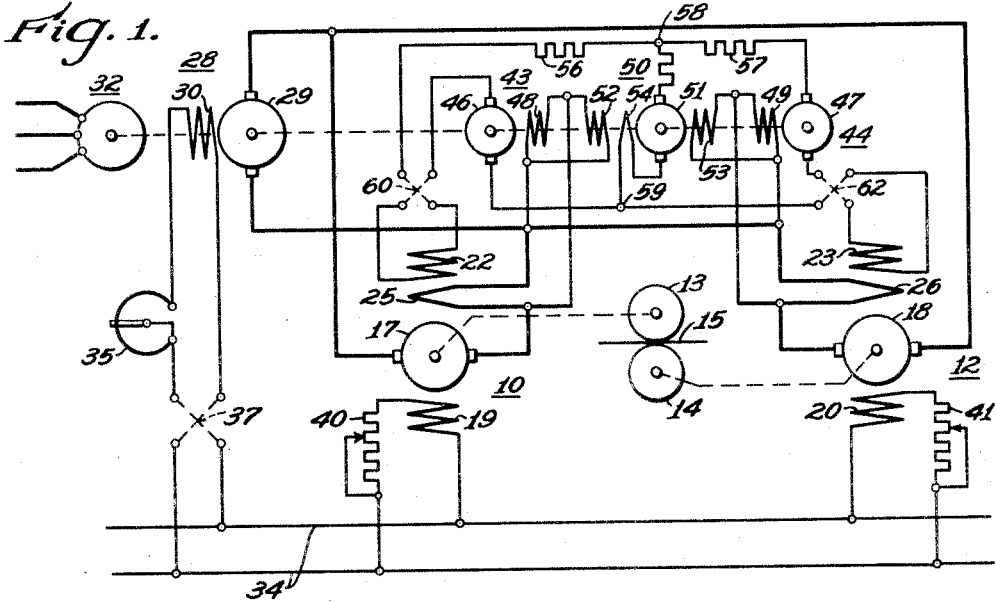

Nov. 21, 1950 — A. F. KENYON — 2,530,972
LOAD BALANCING SYSTEM FOR DYNAMOELECTRIC MACHINES
Filed Oct. 23, 1947

WITNESSES:
Robert C. Baird
F. V. Giolma

INVENTOR
Alonzo F. Kenyon.
G. M. Crawford
ATTORNEY

Patented Nov. 21, 1950

2,530,972

UNITED STATES PATENT OFFICE 2,530,972

LOAD BALANCING SYSTEM FOR DYNAMOELECTRIC MACHINES

Alonzo F. Kenyon, Pittsburgh, Pa., assignor to Westinghouse Electric Corporation, East Pittsburgh, Pa., a corporation of Pennsylvania Application October 23, 1947, Serial No. 781,639

9 Claims. (Cl. 318—100)

1

My invention relates generally to load balancing systems, and it has reference in particular to load balancing systems for electric motors having driving connections with a common load, such as in the case of the driving motors of the rolls in a roll stand, a double armature motor, two motors driving a mine hoist, or the like.

Generally stated it is an object of my invention to provide an improved load balancing system for dynamo-electric machines which is simple and inexpensive to manufacture and is reliable and effective in operation.

More specifically it is an object of my invention to provide in a load balancing system for motors connected in driving relation with a common load, for using a load balancing generator in a bridge circuit for varying the excitation of the motors.

Another object of my invention is to provide in a load balancing system for a pair of motors having a driving connection with a common load, for using a regulating generator responsive to a differential between the loads on the motors in a bridge circuit with field excitation windings of the two motors.

Yet another object of my invention is to provide in a load balancing system for using a common load balancing generator in a bridge circuit with separately excited series field windings of a pair of roll motors and their associated series type exciters for obtaining a balance of load between the motors.

It is an important object of my invention to provide in a load balancing system for using a load responsive generator for varying the excitation of the usual shunt or series type field windings so as to obtain load balance without requiring separate load balancing field windings.

It is also an object of my invention to provide in a load balancing system for using a single load balancing generator responsive to a differential between the loads on a pair of motors having a driving connection with a common load and for connecting the generator in a bridge circuit with the shunt field windings of the motors for balancing the load therebetween.

Other objects will, in part, be obvious and will in part, be explained hereinafter.

In practicing my invention in one of its forms, the armatures of a pair of motors which are connected for driving the upper and lower rolls of a roll stand are supplied with electrical energy from a reversible generator, and the shunt field windings thereof are separately excited from a suitable source. The motors are also provided with series field windings which are connected

2 in a bridge circuit with exciters of the series type responsive to the loads of the respective motors, and a load balancing regulating generator which is responsive to a differential between the loads on the motors.

Figure 2:
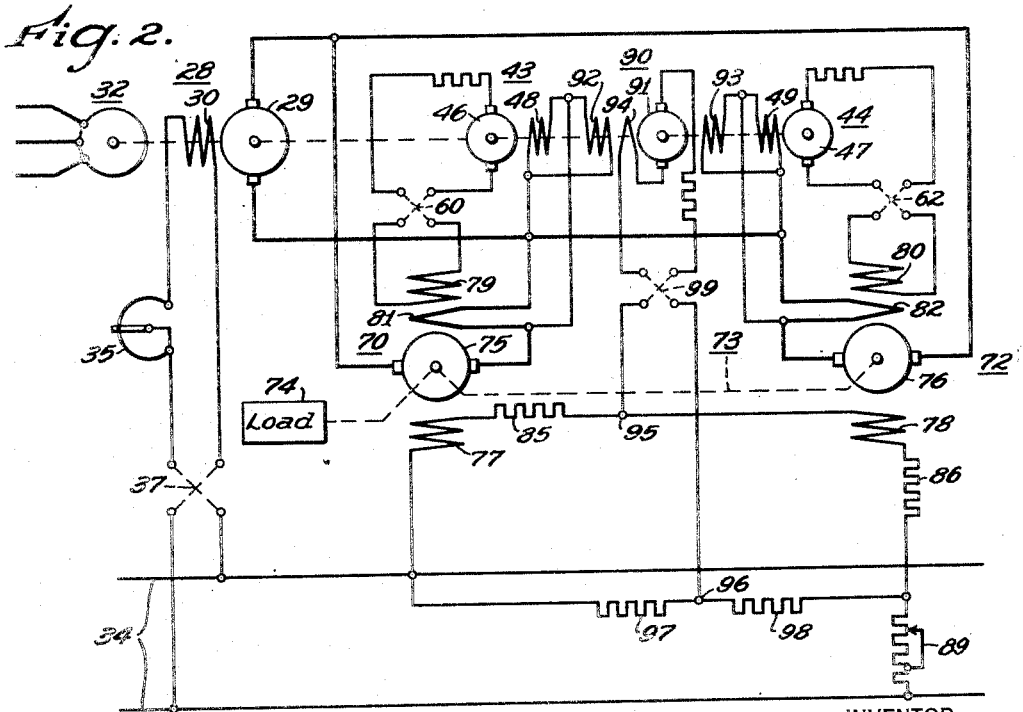

For a more complete understanding of the nature and scope of my invention, reference may be made to the following detailed description, which may be read in connection with the accompanying drawing in which:

Figure 1 is a diagrammatic view of a load balancing system embodying the invention in one of its forms, and Figure 2 is a diagrammatic view of a load balancing system embodying the invention in another of its forms.

Referring to Figure 1 the reference numerals 10 and 12 may denote generally a pair of roll drive motors connected in driving relation with the upper and lower rolls 13 and 14, respectively, of a roll stand for engaging material 15 upon which a rolling operation is to be performed.

The motors 10 and 12 may comprise armatures 17 and 18, shunt type field windings 19 and 20, series type field windings 22 and 23, and commutating pole and/or compensating field windings 25 and 26, respectively.

The armatures 17 and 18 may be supplied with electrical energy from a suitable source of voltage such as, for example, a generator 28 having an armature 29 and a shunt field winding 30. The armature 29 may be connected in driving relation with a suitable prime mover such as an alternating current motor 32. The field winding 30 may be energized from a source of control voltage represented by conductors 34. A field rheostat 35 may be provided for varying the energization of the field winding 30, and hence the output voltage of the generator. Means such as a reversing switch 37 may be provided for reversibly connecting the field winding 30 to the conductors 34, so as to provide for reversing the polarity of the output voltage of the generator 28.

The field windings 19 and 20 of the motors 10 and 12 may be energized from a suitable source, being, for example, connected to the conductors 34 through field rheostats 40 and 41, respectively. The commutating pole and/or compensating field windings 25 and 26 may be connected in series-circuit relation with their respective armatures 17 and 18 in the usual manner.

In order to effect compounding of the roll motors 10 and 12, the series type field windings 22 and 23 may be energized from series type exciters 43 and 44, comprising armatures 46 and 47, and field windings 48 and 49, respectively. The exciters 43 and 44 may be driven by the motor 32, and the field windings 48 and 49 may be energized in accordance with the loads on the motors 10 and 12, being, for example, connected across the compensating and/or commutating pole field windings 25 and 26, respectively.

In order to provide for balancing the loads on the motors 10 and 12 without providing separate load balancing field windings on the motors, a common load balancing regulating generator 50 may be provided, which may be driven by the motor 32, and comprises an armature 51, field windings 52 and 53 and a series field winding 54, which is at least partially self-energizing so as to provide a partially tuned armature circuit. The armature 51 of the load balancing generator 50 may be connected in a bridge circuit with the series type field windings 22 and 23 so as to provide for varying the energizations thereof in opposite senses in accordance with the differential between the loads on the motors 10 and 12. The field windings 22 and 23 may, for example, be connected in series circuit relation with the armatures 46 and 47 of the series type exciters and a pair of control resistors 56 and 57 to provide a closed loop circuit. The armature 51 of the load balancing generator 50 may be connected in bridging relation between terminal point 58 intermediate the control resistors 56 and 57, and diagonally opposite terminal point 59 which is intermediate the armature 46 and the field winding 23. This provides a bridge circuit with the resistors 56 and 57 in adjacent legs, the junction point 58 being therebetween. The series exciter armature 46 and field winding 22 are in the third leg, while the armature 47 and field winding 23 are in the fourth leg, with the junction point 59 therebetween. The series type field windings 22 and 23 are energized from the exciters 43 and 44 to provide the desired series characteristics. The load balancing generator 50, being connected across the loop circuit between points 58 and 59 may function to vary the excitation of the series type windings 22 and 23 in opposite senses, to effect load balance.

By connecting the field windings 52 and 53 in parallel-circuit relation with the field winding 48 and 49 of the series type exciters 43 and 44, and in opposed relation to each other, the output voltage of the load balancing regulating generator 50 will be substantially zero when the loads on the motors 10 and 12 are balanced. Should the load on the motor 10 exceed that of the motor 12, the energization of the field winding 52 of the load balancing generator will exceed that of the field winding 53. Accordingly, the load balancing generator 50 produces a voltage in such a direction as to increase the energization of the series type field winding 22 and decrease the energization of the series type field winding 23. Accordingly, the motor 10 tends to slow down and drop a portion of its load, while the motor 12 tends to speed up, thus increasing the load thereon until the load between the motors is balanced.

In order to provide for utilizing my invention in a reversible drive where the direction of current through the armatures 17 and 18 is reversed, reversing switches 60 and 62 may be utilized for reversibly connecting the series type field windings 22 and 23 in circuit relation with the armatures 46 and 47 of the series type exciters. The switches 60 and 62 may be operatively connected with the reversing switch 37 in the field circuit of the main generator 28, so that the connections of the series type field windings 22 and 23 will be reversed whenever the polarity of the generator 28 is reversed. During reverse operation, the operation of the system is similar to that described for forward operation.

Referring to Figure 2, the reference numerals 70 and 72 may denote generally a pair of motor units having a driving connection to a common load, such as, for example, the motor elements of a double armature motor 73 driving load 74 such as a single roll in a roll stand. The motors may comprise armatures 75 and 76, shunt field windings 77 and 78, series field windings 79 and 80, together with compensating and/or commutating field windings 81 and 82.

The armatures 75 and 76 may be supplied with electrical energy from a source of voltage such as the generator 28, which may comprise the armature 29 and the field winding 30 as described in connection with the system shown in Figure 1. The generator 28 may also be provided with a driving motor 32, and the field winding 30 may be likewise connected to a substantially constant potential source represented by the conductors 34 through a reversing switch 37, and rheostat 35.

The series type field windings 79 and 80 may be supplied with electrical energy from series type exciters 43 and 44 driven by the motor 32 and having field windings 48 and 49 which may be connected across the compensating field windings 81 and 82 of the motors 70 and 72, respectively. Reversing switches 60 and 62 may be provided for reversibly connecting the series type field windings 79 and 80 to their respective exciters. The shunt field windings 77 and 78 of the motors 70 and 72 may be connected to the conductors 34 in series-circuit relation with the shunt field resistors 85 and 86 and a common field rheostat 89.

In order to provide for balancing the loads on the motors 70 and 72, a common balancing regulating generator 90 may be provided having an armature 91, opposed field windings 92 and 93 and a series field winding 94. The exciter 90 may be of the self exciting regulating generator type and driven by the motor 32. The field windings 92 and 93 may be energized in accordance with the loads on the motors 70 and 72 being, for example, connected in parallel-circuit relation with the field windings 48 and 49 across the compensating field windings 81 and 82, respectively. In order to balance the loads on the motors 70 and 72 without requiring separate load balancing field windings, control resistors 97 and 98 may be connected in series relation with each other and in shunt relation with the windings 77 and 78 to provide a closed loop circuit. The armature 91 of the load balancing generator 90 may be connected across the loop circuit in shunt circuit relation with and in a bridge circuit with the shunt field windings 77 and 78, and the resistors 97 and 98, being, for example, connected between terminal point 95 intermediate the field windings 77 and 78 and diagonally opposite terminal point 96 intermediate the control resistors 97 and 98. The windings 77, 78 and the resistors 97, 98 each form one leg of a bridge circuit similar to a Wheatstone bridge circuit and the load balancing generator 90 is connected in the bridging circuit in place of the usual meter. A reversing switch 99 may be utilized for reversing the connections of the armature 91 whenever the direction of operation of the motors 70 and 72 is reversed.

In normal operation the series type exciters 43 and 44 energize the field windings 79 and 80 cumulatively with respect to their respective shunt type field windings 77 and 78 so as to provide for the desired compounding of the motors. When the loads on the motors 70 and 72 are balanced, the field windings 92 and 93 of the load balancing exciter are equally energized. Since these field windings are connected in opposed relation, the output voltage of the load balancing generator is substantialy zero. Accordingly the field windings 77 and 78, which are connected in series-circuit relation across the conductors 34, will be equally energized.

Should the load on the motor 70 increase, the energization of the field winding 92 will exceed that of the opposing field winding 93. Accordingly, the load balancing generator 90 generates an output voltage proportional to the differential between the loads on the motors 70 and 72. The direction of this output voltage will be such as to increase the energization of the field winding 77 and decrease the energization of the field winding 78. Accordingly, the motor 70 tends to slow down, while the motor 72 tends to speed up. The back voltage of the motor 70 increases, while that of the motor 72 decreases. Accordingly, the armature current and the load carried by the motor 70 decreases, while that of the motor 72 increases until the loads on the motors are balanced. For reverse operation the reversing switches 37, 60, 62 and 99 may be operated to reverse the energization of the generator field winding 30, the series type field windings 79 and 80 to reverse the connections of the armature 91 in the bridge circuit. Operation of the system in the reverse direction is substantially identical with that described hereinbefore for forward operation.

It will be realized that a bridge circuit of the type embodying my invention may be used to balance the load between two generators as well as between two motors. Where the regulating generator is used to vary the shunt field excitation, the series field winding may be omitted if desired. My invention is applicable to separate motors driving a common load, as well as to the two motor units of a double armature motor.

From the accompanying drawing and the above description, it will be apparent that I have provided in a simple and effective manner for balancing the loads between a pair of motors having driving connections with a common load. By utilizing a single load balancing generator in a bridge circuit with either shunt or series type field windings of the two motors accurate and effective load balancing may be obtained without requiring special load balancing windings on the motors. Any tendency of one motor to carry more than its share of the load results immediately in increased excitation of the overloaded motor and decreased excitation of the other motor, thus restoring or maintaining a balance of load between the motors. A load balancing system embodying the features of my invention is simple and inexpensive to manufacture and is reliable and effective in operation.

Since certain changes may be made in the above-described construction, and different embodiments of the invention may be made without departing from the spirit or scope thereof, it is intended that all the matter contained in the above description and shown in the accompanying drawing shall be considered as illustrative and not in a limiting sense.

I claim as my invention:

1. In a control system for a pair of motors having a driving connection with a common load, said motors having shunt and series type field windings, circuit means supplying electrical energy to the shunt type field windings, additional circuit means supplying electrical energy to the series type field windings in accordance with the loads on the motors, circuit means connecting the field windings of one of said type in a loop circuit, and a load balancing generator responsive differentially to the loads on the motors, said generator being connected across the loop circuit in shunt circuit relation with said field windings of one of said types for varying the energization thereof in opposite senses balancing the loads on the motors.

2. A load balancing system comprising, a pair of motors having separately excited shunt and series type field windings, circuit means connected to supply electrical energy to the shunt field windings, a series type exciter responsive to the load on each motor, circuit means connecting the series type field windings and series type exciters in a closed loop circuit, and a load balancing regulating generator responsive differentially to the loads on the motor connected across the loop circuit in shunt circuit relation with the series type field winding and series type exciter of each motor.

3. In combination, a pair of motors having field windings and armatures connected in driving relation with the upper and lower rolls of a rolling mill, circuit means connected to supply electrical energy to the armatures, additional circuit means connecting the field windings in series circuit relation to a separate source of electrical energy, resistance means connected in shunt circuit relation with said windings to provide a loop circuit and a load balancing generator responsive in different senses to the loads on the motors connected across the loop circuit to points intermediate the field windings and the resistance means to vary the energization of the field windings in opposite senses in accordance with differentials between the loads on the motor.

4. The combination with a pair of motors having separately excited shunt type field windings and armatures having driving connections with a common load, a generator connected to supply variable voltage electrical energy to the armatures, switch means operable to reverse the polarity of said voltage, circuit means connecting the shunt type field windings to a source of control voltage in series circuit relation, additional circuit means connected in shunt circuit relation with the field windings to provide a loop circuit, a load balancing generator differentially responsive to the armature currents of the motors connected in bridging relation across the loop circuit in shunt relation with each of the shunt type field windings, and additional switch means operable to reversibly connect the load balancing generator in the loop circuit.

5. In a drive for a rolling mill, a pair of electric motors having field windings and armatures connected in driving relation with the rolls of a roll stand, a series type exciter associated with each motor having an armature and a field winding energized in accordance with the armature current of its associated motor, a series type load balancing generator having an armature and field windings energized in opposite senses in accordance with the armature currents of the motors, and circuit means connecting the armatures of the series type exciters and the field windings of the motors in a closed circuit with the armature of the load balancing exciter connected therebetween across the loop circuit in bridging relation.

6. A load balancing system for a pair of motors connected in driving relation with a common load and having shunt field windings comprising, circuit means for connecting the shunt field windings in series circuit relation to a source of excitation, circuit means connecting the shunt field windings in a closed loop circuit and a regulating generator connected across the loop circuit in shunt circuit relation with the field windings to vary their energization from the source in opposite senses, said regulating generator being responsive to a differential between the loads on the motors.

7. In a load balancing system for a pair of dynamo electric machines having a common load, excitation field windings for the dynamo electric machines, circuit means including voltage dividing means connecting the excitation field windings in a closed loop circuit, and load balancing means connected across the loop circuit to an intermediate point of the voltage dividing means and a point intermediate the excitation field windings, said load balancing means being differentially responsive to the loads on the machines and disposed to vary the energization of the field windings in opposite senses.

8. A load balancing system for a pair of electric motors having driving connections with a common load, comprising, excitation means for each of the motors including a field winding for each motor disposed to be connected to a source of electrical energy, a load balancing generator differentially responsive to the loads on the motors, impedance means connected in shunt circuit relation with the field windings to provide a closed loop circuit, and circuit means connecting the load balancing generator across the loop circuit in bridging relation between the impedance means and a point intermediate the field windings to vary the energization thereof in opposite senses and maintain a balance of load between the motors.

9. A twin drive comprising, a pair of motors having driving connection with a common load and each having a field winding, circuit means including resistance means connecting the field windings in a closed loop circuit, excitation means for the field windings, and a regulating generator responsive in opposite senses to the loads on the motors connected across the loop circuit between points intermediate said field windings and said resistance means to vary the energization thereof in opposite senses and balance the loads of the two motors.

ALONZO F. KENYON.

REFERENCES CITED

The following references are of record in the file of this patent:

UNITED STATES PATENTS

| Number | Name | Date |
|---|---|---|
| 1,877,681 | Mickey | Sept. 13, 1932 |
| 2,182,631 | Kenyon | Dec. 5, 1939 |
| 2,238,406 | Wright | Apr. 15, 1941 |

FOREIGN PATENTS

| Number | Country | Date |
|---|---|---|
| 278,409 | Germany | Sept. 23, 1914 |